Patented Apr. 17, 1945

2,373,777

UNITED STATES PATENT OFFICE 2,373,777

SOLUBILIZATION OF FORMALDEHYDE POLYMERS

Oscar Peterson, Elizabeth, N. J., assignor to E. I. du Pont de Nemours & Company, Wilmington, Del., a corporation of Delaware No Drawing. Application October 17, 1940, Serial No. 361,579

8 Claims. (Cl. 260—340)

This invention relates to the preparation of aqueous formaldehyde solutions and more particularly to the preparation of such solutions using formaldehyde polymers as the source of formaldehyde.

Aside from the usual aqueous solutions of formaldehyde which are available commercially, formaldehyde is also sold in the form of a solid polymer known as paraformaldehyde. Many of the uses made of paraformaldehyde require that it first be dissolved in an aqueous medium. However, the product is practically insoluble in cold water and only moderately soluble in hot water. The low solubility and low rate of solution are for many purposes distinctly undesirable properties of paraformaldehyde.

The use of alkaline agents, such as caustic alkali and alkaline salts, for increasing the solubility of paraformaldehyde in water has been suggested. There are certain disadvantages attending the use of such alkaline agents. For example, it is well known that formaldehyde in the presence of strongly alkaline materials undergoes the well known Cannizzaro reaction to produce methyl alcohol and formic acid. Furthermore, when such alkaline materials are employed to increase the solubility of paraformaldehyde in water, the resulting solutions will contain the alkaline material or reaction products thereof, as an impurity which, in many instances, is objectionable.

I have discovered that the solubility of paraformaldehyde in aqueous media may be greatly increased by having present a small amount of hexamethylenetetramine. Hexamethylenetetramine for this purpose is definely superior to strongly alkaline materials in that no substantial amount of impurities in the formaldehyde solution results from the addition of hexamethylenetetramine and no non-volatile substance is introduced. Furthermore, hexamethylenetetramine does not cause any substantial decomposition of formaldehyde to form methanol and formic acid.

It is accordingly one object of the present invention to provide an improved method of dissolving paraformaldehyde, and other difficultly soluble polymers of formaldehyde, in aqueous media. Another object is the provision of new formaldehyde polymer compositions, such as compositions of paraformaldehyde and polyoxymethylenes, which dissolve readily in water to produce formaldehyde solutions containing large amounts of dissolved formaldehyde. These and still further objects will be apparent from the ensuing description of the present invention.

The above objects may be accomplished in accordance with my invention by subjecting a solid, difficultly soluble formaldehyde polymer, such as paraformaldehyde or a polyoxymethylene, to the action of an aqueous medium in the presence of a small amount of hexamethylenetetramine. In one modification of the invention, the hexamethylenetetramine may be dissolved in the aqueos medium prior to contacting the medium with the formaldehyde polymer. An alternate method is to mix a suitable quantity of hexamethylenetetramine in dry form with the solid formaldehyde polymer and then add the resulting dry mixture to water. Either method may be practiced with good results.

A still further modification of the present method consists in employing ammonia in place of hexamethylenetetramine. Thus, a small amount of ammonia may be added to the water in which the paraformaldehyde is to be dissolved. When this is one, the aqueous solution of ammonia, upon contact with the paraformaldehyde, forms hexamethylenetetramine which then acts as the solubilizing agent. Also, hexamethylenetetramine may be employed in accordance with the present invention by adding either hexamethylenetetramine or a small amount of ammonia to aqueous solutions of formaldehyde from which paraformaldehyde is to be prepared by the usual evaporation method. Upon evaporation of formaldehyde solutions to which a small amount of either hexamethylenetetramine or ammonia has been added, there will be obtained paraformaldehyde containing a small amount of hexamethylenetetramine uniformly distributed throughout the product.

While the present method is particularly useful for the preparation of formaldehyde solutions using paraformaldehyde, it may also be practiced with good results in the preparation of formaldehyde solutions employing various other difficultly soluble formaldehyde polymers as the source of formaldehyde. Thus hexamethylenetetramine may be used as a solubilizing agent for polymers known as polyoxymethylenes. Such polymers include formaldehyde polymers prepared by the addition of either acid or alkali to concentrated aqueous formaldehyde solutions.

The invention will be better understood from the following examples:

Example 1

A 60 gram portion of a stock of paraformaldehyde was heated with 200 grams of water to a temperature of 60° C. for 25 minutes, after which undissolved paraformaldehyde was separated by filtration. There was obtained a clear solution which contained 4% by weight of dissolved formaldehyde, as determined by a standard analytical method. A second 60 gram portion of the same stock of paraformaldehyde was treated in the same manner except that water to which had been added 2.5 grams of hexamethylenetetramine was employed. There resulted, upon filtration, a solution containing 21.38% by weight of dissolved formaldehyde.

Example 2

A 60 gram portion of a stock sample of paraformaldehyde was heated at 60° C. with 197.5 grams of water for 45 minutes. The mixture was filtered and the filtrate was found by analysis to contain 4.6% by weight of formaldehyde. The procedure was repeated using 60 grams of paraformaldehyde from the same stock sample and 197.5 grams of water to which had been added an amount of ammonia (in the form of a 30% aqueous solution) equivalent to 1.19 grams of hexamethylenetetramine. The solution obtained contained 21.8% by weight of formaldehyde.

In a similar test, the addition of ammonia in an amount corresponding to 0.6 gram of hexamethylenetetramine, resulted in a solution which contained 22% by weight of formaldehyde. Other experiments carried out under substantially the same conditions (employing ammonia in place of hexamethylenetetramine) showed that the formaldehyde concentration in the resulting solution could be increased to about 37% by heating 80 grams of the same paraformaldehyde with 120 grams of water for 2 hours at 60° C., but that further heating at that temperature did not further increase the concentration of formaldehyde in the solution to any appreciable extent.

Example 3

A commercial grade of paraformaldehyde was screened so as to include only particles which passed through a 200 mesh screen. To a portion thereof there was added 0.5% by weight of hexamethylenetetramine. Five grams of the resulting mixture was added to 25 grams of distilled water and the mixture agitated mechanically at a temperature of substantially 25° C. for one hour. The mixture was filtered, the undissolved material washed with 10 cc. of water and the amount of formaldehyde present in the combined filtrate and washings was determined analytically. It was found that 14.8% of the paraformaldehyde in the original sample was present as dissolved formaldehyde at the end of the test. A similar test employing paraformaldehyde to which no hexamethylenetetramine had been added gave a solubility value of 1.4%.

Example 4

The effect of various amounts of hexamethylenetetramine, added in dry form, upon the solubility of 200 mesh paraformaldehyde, in water at ordinary temperatures is indicated by the following data:

| Per cent by weight of hexamethylene tetramine added | Per cent paraformaldehyde dissolved | pH of solution |
|---|---|---|
| None | 28.0 | 6.97 |
| 0.25 | 54.6 | 7.09 |
| 0.5 | 61.6 | 7.22 |
| 1.0 | 69.6 | 7.36 |
| 2.5 | 69.0 | 7.45 |
| 5.0 | 69.5 | 7.56 |
| 10.0 | 69.6 | 7.80 |

The pH values were determined by means of a Coleman electrometer using a 5% aqueous solution. The solubility values were determined by the method described in Example 3.

It will be apparent from the above data that there is generally no advantage in employing amounts of hexamethylenetetramine greater than about 1% by weight of the paraformaldehyde, although the amount of the solubilizing agent may be varied considerably without departing from the scope of the invention. In general, amounts ranging from 0.1 to 10% based upon the weight of paraformaldehyde may be used with good results, but the preferred amounts will fall within the range of 0.25 to 1% by weight.

Example 5

To a paraformaldehyde having a solubility of about 2.8% at 30° C., as determined by the method described in Example 3, there was added 3% by weight of hexamethylenetetramine. The resulting mixture was soluble to the extent of 36%. A similar mixture prepared by adding 1.4% by weight of sodium sulfite was completely soluble. Fresh mixtures similar to the above, i. e. containing 3% hexamethylenetetramine and 1.4% of sodium sulfite, respectively, were prepared. The solubilities after storage for one week at room temperature were 20% and 29%, respectively, at 27° C. Portions of the two samples were stored in the dry state at a temperature of about 60° C. in an accelerated storage test. After a period of 15 hours, the solubility of the sample containing hexamethylenetetramine was found to be 26%, whereas that of the sample containing sodium sulfite had dropped to 1.5%. Both determinations were made at 27° C.

The results from the above series of tests show that while sodium sulfite is effective initially in increasing the solubility, that agent is distinctly inferior to hexamethylenetetramine because its action is only temporary. That is probably because sodium sulfite induces the decomposition of paraformaldehyde to form methanol and formic acid. An indication of this is found in the fact that paraformaldehyde to which sodium sulfite has been added increases in acidity during storage. Thus, the paraformaldehyde-sodium sulfite mixture described in Example 5, dissolved initially in water to give a solution having a pH of 9.8 as determined electrometrically using a Beckmann glass electrode. The pH values of solutions prepared from the same dry mixture after it had been stored one week at room temperature and after 15 hours at 60° C. were 8.5 and 6.3 respectively. In contrast thereto, the corresponding paraformaldehyde-hexamethylenetetramine mixture showed no tendency to develop acidity. Thus, the pH values found for solutions prepared initially from the dry mixture, and after storage for one week at room temperature and after 15 hours at 60° C. were 7.0, 6.8 and 7.1, respectively.

Example 6

To a polyoxymethylene having a solubility of 1.6% at 30° C., as determined by the method described in Example 3, there was added 1% by weight of hexamethylenetetramine in dry form. The corresponding solubility of the resulting mixture was 11.9%.

The present solid compositions comprising mixtures of a difficultly soluble formaldehyde polymer, particularly paraformaldehyde, and hexamethylenetetramine may be employed for preparing aqueous formaldehyde solutions for general use. Similarly, the present process may be employed as a general method for preparing formaldehyde solutions from formaldehyde polymers of the type indicated.

Throughout the specification and in the appended claims, the term "difficultly soluble formaldehyde polymer" is used to mean a polymer of formaldehyde which is substantially insoluble or relatively so in water at ordinary temperature conditions. Some such polymers may have a slight solubility, e. g. as high as about 5%, especially in the case of paraformaldehyde which has been recently made. In general, however, their normal solubilities will be considerably lower and will be in the neighborhood of 1 to 2% or less. Illustrative of such difficultly soluble polymers are paraformaldehyde and the polyoxymethylenes. It should be noted in connection with such polymers, and particularly in connection with paraformaldehyde, that the solubility of a given polymer will depend largely upon its previous history. Two given paraformaldehyde products may vary considerably in their water solubilities. The explanation generally accepted for this fact is that the solubility of any particular paraformaldehyde is dependent upon the degree of polymerization of that product. A paraformaldehyde that is highly polymerized will have a low solubility whereas one whose degree of polymerization is relatively low will be slightly more soluble. The temperature under which the paraformaldehyde has been treated, for example during its preparation from formaldehyde solutions, is an important factor in determining the degree of polymerization. A product which has been heated for an extended period of time at a high temperature, e. g. during the drying treatment, will be substantially less soluble than a product prepared at a relatively low temperature. The solubility quite frequently varies with age and in general decreases with age, especially when the product was subjected to but mild temperature conditions during its preparation. Both the more insoluble and the more soluble forms of paraformaldehyde indicated above are to be considered as coming within the scope of the term "difficultly soluble formaldehyde polymer" as used in the specification and claims.

It is apparent that many widely different modifications of the present invention may be made without departing from the spirit and scope thereof, and it is to be understood that the invention is not restricted to the specific embodiments described and illustrated hereinabove, but includes all such modifications, variations, and equivalents, as fall within the scope of the appended claims.

I claim:
1. The method comprising dissolving a difficultly soluble formaldehyde polymer in water containing hexamethylenetetramine.
2. The method comprising dissolving paraformaldehyde in water containing hexamethylenetetramine.
3. The method comprising dissolving paraformaldehyde containing 0.1 to 10% by weight of hexamethylenetetramine based upon the weight of said paraformaldehyde, in water.
4. The method comprising dissolving paraformaldehyde containing 0.25 to 1% by weight of hexamethylenetetramine based upon the weight of said paraformaldehyde, in water.
5. A soluble composition of matter comprising a mixture of a solid, difficultly soluble formaldehyde polymer and a sufficient amount of hexamethylenetetramine to render the composition soluble.
6. A soluble composition of matter comprising a mixture of a solid difficultly soluble formaldehyde polymer and 0.1 to 10% by weight of hexamethylenetetramine based upon the weight of said polymers.
7. A soluble composition of matter comprising a mixture of paraformaldehyde and 0.1 to 10% by weight of hexamethylenetetramine based upon the weight of said paraformaldehyde.
8. A soluble composition of matter comprising a mixture of paraformaldehyde and 0.25 to 1% by weight of hexamethylenetetramine based upon the weight of said paraformaldehyde.

OSCAR PETERSON.